W. Pimlott.
Lathe Work-Holder.
No 60,238.  Patented Dec. 4, 1866.
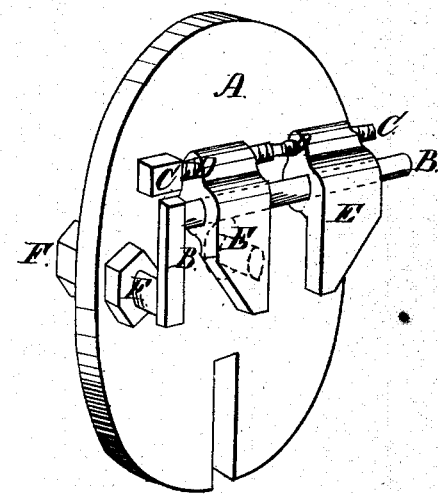
Witnesses:
Inventor:
William Pimlott

United States Patent Office.

IMPROVEMENT IN LATHE DOGS.

WILLIAM PIMLOTT, OF SYRACUSE, NEW YORK.

Letters Patent No. 60,238, dated December 4, 1866.

SPECIFICATION.

Be it known that I, WILLIAM PIMLOTT, of the city of Syracuse, in the county of Onondaga, and State of New York, have invented a new and useful Improvement in a Dog for Lathes or other purposes; and I do hereby declare that the following is a full, clear, and exact description of the construction and operation of the same, reference being had to the annexed drawings, making a part of this specification, in which—

Figure 1 is a perspective view.

Like letters refer to like parts.

Letter A represents the face plate to which the dog is fastened; letter B, the bar; letter C, the screw; letter D, the nut of the jaws; letters E E, the jaws; letter F, the set nuts. The dog is made of malleable wrought iron or steel, as may be desired; the bar, letter B, is so made that one end passes through the face plate through a hole in the face plate; the part passing through the face plate has a thread cut in it, and nuts, letters F F, are used to fasten it firmly to the desired place to the face plate; said bar extends through the face plate sufficiently far so as to allow the jaws of the dog to be placed at any desired distance from the face plate; said bolt is bent so as to permit the jaws of the dog to occupy a position directly in front of the face plate and opposite the centre of the lathe. The bar that passes in front of the face plate is made round, with a slot in it extending the whole length of the bar; this bar passes through the jaws; the jaws are made of a solid piece of iron, with holes through each, through which the bar passes, and also a left-handed and right-handed screw passes, as represented in the drawings. Through the jaws are pins which pass into the slot of the bar, thereby keeping the jaws from turning over; said jaws of the dog will adjust themselves to the centre whether the same is eccentric or concentric with the bolt to be turned, operating equally as well to a round or square bolt. The left-handed and right-handed screw is used to compress the jaws against the bolt, thereby holding the bolt firmly in its desired place while being worked, when the left and right-handed screw is turned so as to spread apart the jaws of the dog, the bolt to be used, and may be of any shape, placed to the centre of the lathe, and it may be concentric or eccentric, thereby turning the left and right-handed screw it will bring the jaws to the bolt to be held, the slot in the bar permitting the jaws to adjust themselves to the shape and size of the bolt to be held.

What I claim as my invention, and desire to secure by Letters Patent, is—

The bar B, the screw C, the nut of the jaws D, the jaws E E, the set nuts F F, when the same are constructed and operated substantially in the manner and for the purpose described.

WILLIAM PIMLOTT.

Witnesses:
L. F. SMITH,
Z. C. FOOT.